United States Patent

Mitschelen et al.

[11] Patent Number: 5,833,314
[45] Date of Patent: Nov. 10, 1998

[54] INTEGRATED CHILD SEAT FOR MOTOR VEHICLE-SEAT

[75] Inventors: Rolf Mitschelen, Kirchheim/Teck; Werner Hauser, Calw; Dietmar Zwölfer, Hildrizhausen, all of Germany

[73] Assignee: Mercedes-Benz AG, Stuttgart, Germany

[21] Appl. No.: 953,682

[22] Filed: Oct. 17, 1997

Related U.S. Application Data

[63] Continuation of Ser. No. 665,924, Jun. 19, 1996, abandoned.

[30] Foreign Application Priority Data

Jun. 22, 1995 [DE] Germany ............... 195 22 685.2

[51] Int. Cl.$^6$ ............................................. B60N 2/30
[52] U.S. Cl. ............................. 297/237; 297/256.15
[58] Field of Search .................... 297/236, 237, 297/256.15

[56] References Cited

U.S. PATENT DOCUMENTS

| | | | |
|---|---|---|---|
| 5,265,934 | 11/1993 | Forget | 297/237 |
| 5,282,666 | 2/1994 | Demich et al. | 297/237 |
| 5,553,918 | 9/1996 | Baret et al. | 297/237 |

FOREIGN PATENT DOCUMENTS

| | | | |
|---|---|---|---|
| 0 286 542 A2 | 10/1988 | European Pat. Off. | |
| 3020212 | 12/1981 | Germany | 297/237 |
| 59-156836 | 9/1984 | Japan | 297/237 |
| 59-156837 | 9/1984 | Japan | 297/237 |

*Primary Examiner*—Peter R. Brown
*Attorney, Agent, or Firm*—Evenson, McKeown, Edwards & Lenahan P.L.L.C.

[57] ABSTRACT

An integrated child seat for use with a motor vehicle seat has a forward seat area of the movable seat surface part with at least the width of a commercially available impact body. A rearward seat area has a significantly smaller width.

5 Claims, 2 Drawing Sheets

INTEGRATED CHILD SEAT FOR MOTOR VEHICLE-SEAT

This application is a continuation of U.S. patent application Ser. No. 08/665,924, filed on Jun. 19, 1996 now abandoned.

BACKGROUND OF AND SUMMARY OF THE INVENTION

The present invention relates to a motor vehicle seat with an integrated child seat which has a seat surface comprising two seat surface parts. A forward seat surface part of the child seat is movable over the other seat surface part for raising the seat position.

EP 0 286 542 A2 describes a seat surface of a known motor vehicle seat having a center part which is divided in two parts and which is flanked by two lateral holding parts. The center part of the seat surface is divided into a rearward stationary seat cushion and into a forward movably disposed seat cushion. In order to raise the seat position of the motor vehicle seat and create a child seat, the forward movable seat cushion is swivelled by a parallelogram linkage over the rearward stationary seat cushion toward the backrest so that the forward seat cushion will be situated above the rearward seat cushion. The seat surface for the child seat formed by the forward seat cushion is significantly narrower than the entire seat surface of the motor vehicle seat in the position of the forward seat cushion embedded between the lateral holding parts.

It is an object of the present invention to provide an improved motor vehicle seat whose integrated child seat can be used without high expenditures also for very small children as well as other ages of small children.

This object has been achieved in accordance with the present invention by providing that a forward seat area has at least the width of a conventional impact body (catch table) and a rearward seat area has a significantly smaller width. This rearward seat area of the movable seat surface part, in the child seat position of the motor vehicle seat, directly adjoins the backrest of the motor vehicle seat. This relatively narrow seat surface area does not hinder the guiding of the seat belt so that, when the seat belt is put on the child's pelvic area, it can be securely positioned and thus provides a good restraint in the pelvic area.

As a result of the forward widened seat surface area of the seat surface part, it is advantageously possible to place and support a commercially available impact body or catch table for very small and small children. Such a commercially available impact body is sold, for example, by the Römer Company under the trademark "Römer Vario". Such an impact body is constructed in a cushion-like manner and has two laterally downward projecting legs by way of which the body is deposited on both sides of the child's thighs on a corresponding seat surface. The impact body is therefore situated in front of the child's breastbone and reaches over its thighs.

In conventional motor vehicle seats with an integrated child seat, such a placement of a commercially available impact body is not possible because the seat surface of the higher situated child seat part is not wide enough for supporting the impact body. In known motor vehicle seats with an integrated child seat, it is therefore customary to adapt also the impact body individually to the corresponding child seat (Audi Research Car IAA 81). In contrast, according to the present invention, it is now advantageously achievable to use commercially available impact bodies for the child seat and thus to utilize the child seat also for very small children.

According to a further aspect of the present invention, the length of the rearward seat area corresponds approximately to the length of the rearward seat part. As a result, the rearward and, in the child seat position, lower seat surface part can be advantageously used directly as the supporting surface for the rearward area of the movable seat surface part, and thus the movable seat surface part can be placed directly on the stationary seat surface part.

A yet further feature of the present invention is that the movable forward seat surface part is swivellably linked by a parallelogram linkage or linkages. As a result, the motor vehicle seat position can be changed by a few manual movements from an adult seat position into a child seat position or vice versa.

Other objects, advantages and novel features of the present invention will become apparent from the following detailed description of the invention when considered in conjunction with the accompanying drawings.

DETAILED DESCRIPTION OF THE DRAWINGS

Figure 1:
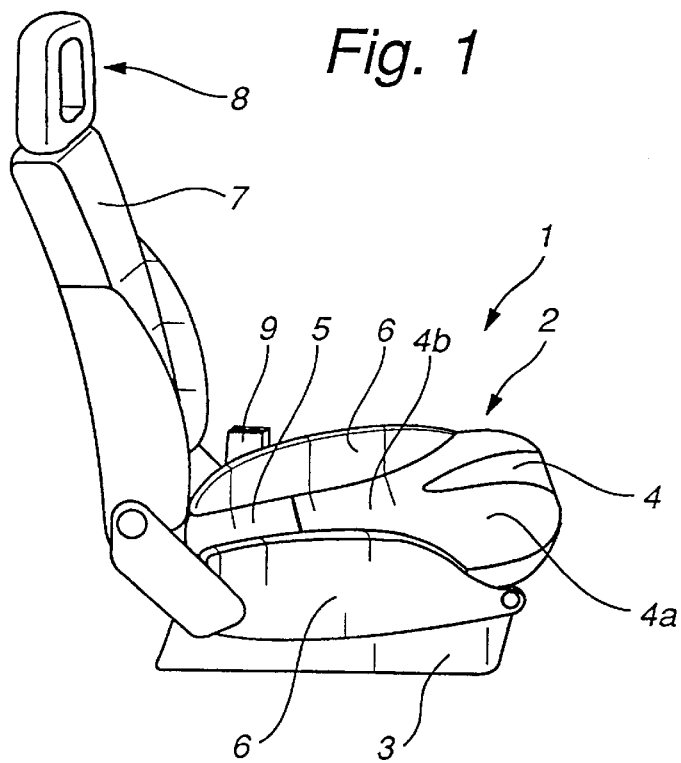
FIG. 1 is a perspective side view of an embodiment of a motor vehicle seat which is provided with an integrated child seat according to the present invention.

A motor vehicle seat 1 according to FIGS. 1 to 4 is illustrated as a front passenger seat of a passenger car. A motor vehicle seat in the sense of the present invention is, however, also a rear seat or a rear seat bench of a motor vehicle. The motor vehicle seat 1 has a seat surface 2 which is arranged on a seat bottom part 3. In addition, the motor vehicle seat has an adjustable backrest 7 as well as a head support 8 mounted on the backrest 7. The seat bottom part 3 is provided with a seat belt buckle 9 which is mounted laterally next to the seat surface 2 on the seat surface bottom part 3.

The seat surface 2 has several seat surface parts 4, 5, 6. Two lateral seat surface parts 6 form lateral holding cheeks and flank a central rearward seat surface part 5 which is arranged adjoining the backrest 7 in a rearward area of the seat surface 2. The seat surface part 5 extends between the two lateral holding parts 6 and is stationarily fastened on the seat bottom part 3. All seat surface parts 4, 5, 6 are provided with corresponding cushion-type paddings. The forward seat surface part 4 adjoins the central rearward seat surface part 5 and extends forward beyond the seat bottom part 3. The lateral holding parts 6 end at a distance behind the forward frontal end of the seat bottom part 3.

A forward seat area 4a of the seat surface part 4 adjoins the lateral holding parts 6 toward the front in a flush manner. The forward seat area 4a is in one piece with a rearward seat area 4b of the seat surface part 4. The seat surface part 4 expands from the rearward seat area 4b to the forward seat area 4a, as viewed from above, in a bell-shaped or tulip-shaped manner. That is, on its end adjoining the seat surface part 5, the rearward seat area 4b has the same width as the seat surface part 5. Toward the front, the width of the seat area 4b at first increases continuously and widens far toward the outside at the level of the forward frontal end of each lateral holding part 6. In this area, the forward seat area 4a also adjoins and has a width which corresponds at least to the distance of the exterior sides of the two lateral holding parts 6 with respect to one another so that the forward seat area 4a extends, with a width-wise direction, along the entire seat surface 2. Thus, the forward seat area 4a represents the wide portion of the seat surface part 4 and the rearward seat area 4b represents the narrow portion of the seat surface part 4. The entire forward seat surface part 4 is supported on the seat bottom part 3, with the rearward seat area 4b being embedded between the lateral cheeks 6.

Figure 3:
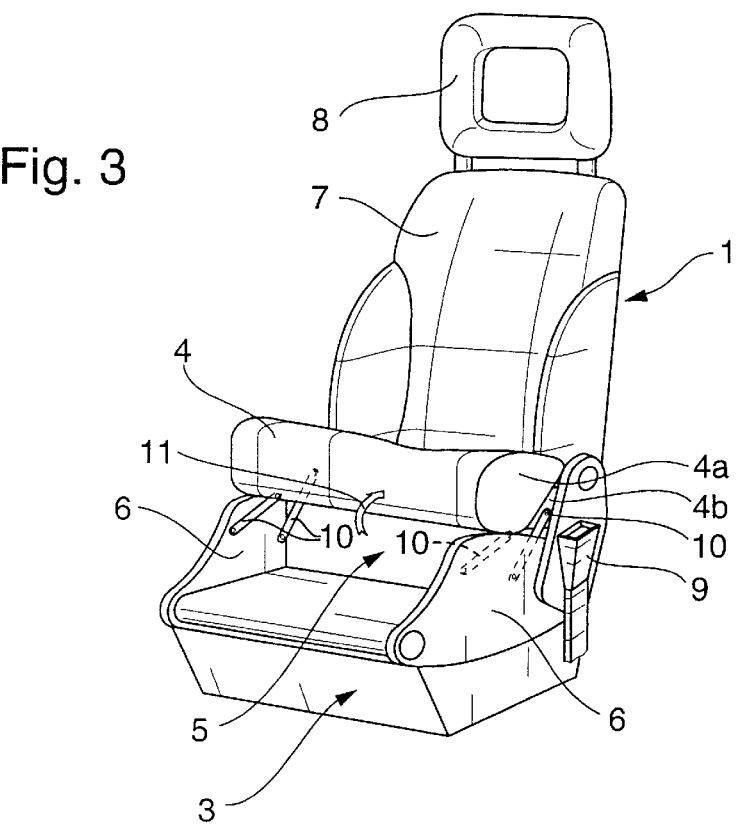
FIG. 3 is a perspective view of the motor vehicle seat according to FIGS. 1 and 2 in its child seat position.
Figure 4:
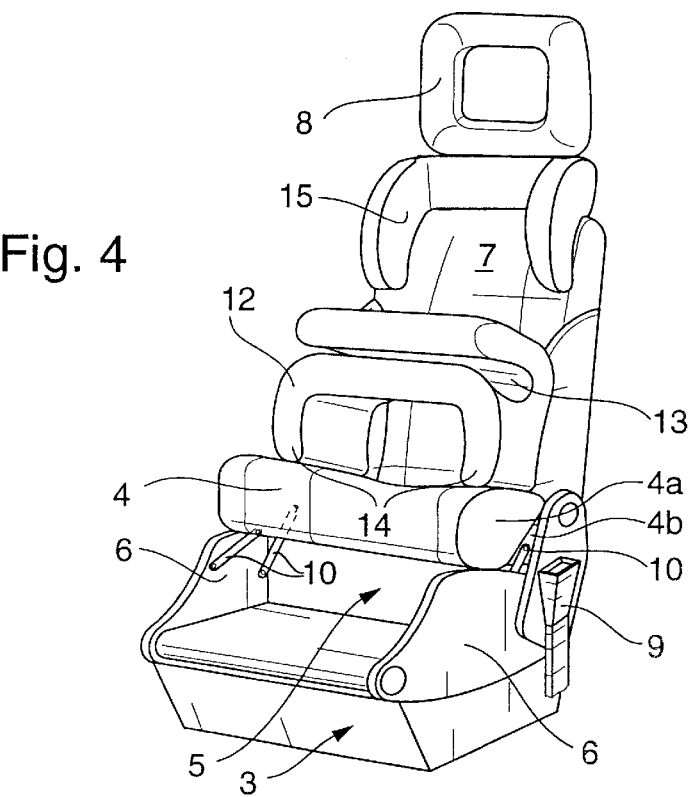
FIG. 4 is a view of the motor vehicle seat of FIGS. 1–3, in which case a commercially available catch table is placed on the upper seat cushion representing a seat surface part.

The seat surface part 4 is, however, not fixedly connected with the seat bottom part 3 but is disposed so that it can be swivelled upwards by a parallelogram linkage 10 as seen in FIG. 3, which linkage is situated on both sides, relative to the stationary surface part 5 corresponding to the arrow 11. FIGS. 3 and 4 show the upwardly swivelled position of the seat cushion 4. In this position, the motor vehicle seat 1 is used as a child seat and has a raised seat position. The forward seat area 4a supported on the lateral cheeks 6.

In the child seat position, the narrow seat area 4b is at the level of the belt buckle 9 so that the pelvic belt portion of a seat belt is guided along the narrow seat area 4b of the child seat. As a result, the pelvic belt portion of the seat belt is guided relatively closely past the child's pelvic area and forms a secure restraint for this pelvic area. The child can therefore not slide through from under the pelvic belt portion.

Because of its wide design, the forward seat area 4a of the seat surface part 4 has at least the normal width of an adult seat so that a commercially available impact body 12 in the form of a catch table which is developed for normal motor vehicle seats can be placed without any additional measures on the forward seat area 4a of the seat surface part 4 as seen in FIG. 4. The impact body 12 has two legs 14 which are supported on the forward seat cushion part 4a in a known manner. In addition, the impact body 12 is provided with a slot 13 for the guiding-through of the seat belt.

Figure 2:
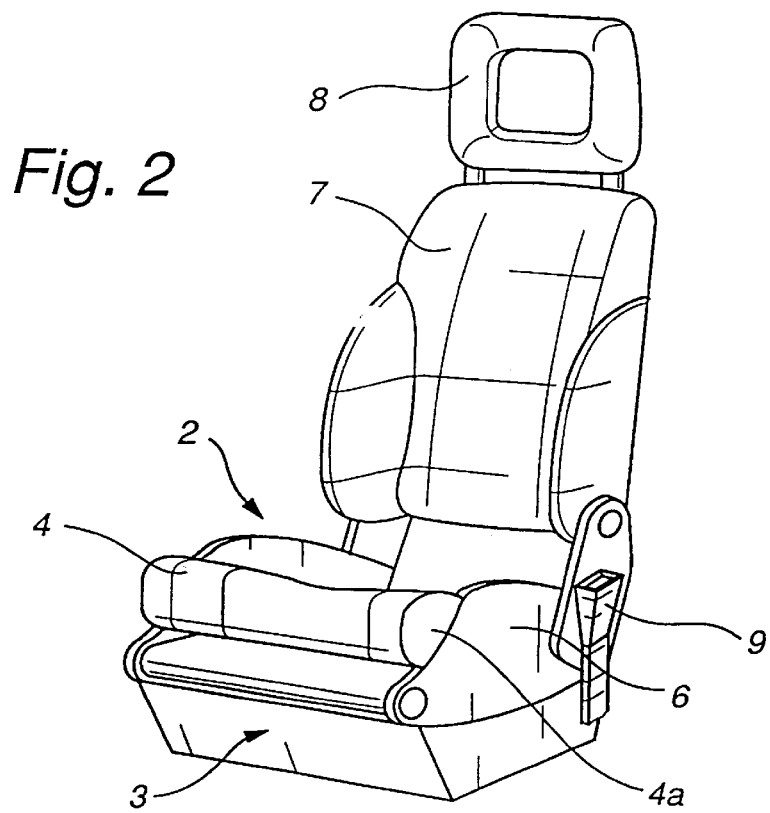
FIG. 2 is a further perspective view of the motor vehicle seat according to FIG. 1 but from another viewing angle.

The illustrated motor vehicle seat 1 can be used for persons of many different ages in that it can be used in its positions 15 according to FIGS. 1 and 2, on one hand, as a seat for an adult but, according to FIGS. 3 and 4, can also be used as a child seat. In its child seat position illustrated in FIG. 3, the motor vehicle seat 1 is suitable for children between the ages of seven and twelve years. With an additional known impact body 12, however, the motor vehicle seat is also suitable for children between the ages of three and a half and seven years. As soon as additional head support 15 is fitted on, as seen in FIG. 4, the thus formed child seat can also be used for children between the ages of nine months and four years.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A motor vehicle seat with an integrated child seat, comprising:

a seat surface with at least two seat surface parts, means for providing relative movement between one of said at least two seat surface parts and the other of said seat surface parts, said one seat surface part is movable to a desired position above a rear seat area of the other of said seat surface parts by said means for providing relative movement, wherein a widened forward seat area of the movable seat surface part always remains forward of a rearward seat area of the movable seat surface part as viewed in a vehicle driving direction, a separable impact body configured to be selectively used and supported on said widened forward seat area of the movable seat surface part, and wherein the widened forward seat area of the movable seat surface part has at least a width corresponding to a width of the selectively used impact body for supporting the impact body thereon, and the rearward seat area of said one seat surface part has a substantially smaller width than the forward seat area and the impact body.

2. The motor vehicle seat according to claim 1, wherein the forward seat area extends along an entire width of the seat surface.

3. The motor vehicle seat according to claim 1, wherein a length of the rearward seat area corresponds approximately to a length of the rearward seat surface part of the at least two surface parts.

4. The motor vehicle seat according to claim 1, wherein said means for providing relative movement includes a parallelogram-linkage operatively arranged on each side of the movable forward seat surface part and configured to provide a swivellable linkage for a swivelling movement of the movable forward seat surface part.

5. The motor vehicle seat according to claim 1, wherein the seat includes lateral holding parts which flank and are operatively connected with said movable seat surface part by said means for providing relative movement to provide a swivelling movement of the movable seat surface part to a raised position.

* * * * *